US011616647B2

(12) United States Patent
Teitzel et al.

(10) Patent No.: US 11,616,647 B2
(45) Date of Patent: *Mar. 28, 2023

(54) API AND ENCRYPTION KEY SECRETS MANAGEMENT SYSTEM AND METHOD

(71) Applicant: CELLAR DOOR MEDIA, LLC, Tacoma, WA (US)

(72) Inventors: Christopher Teitzel, Gig Harbor, WA (US); Tynor Fujimoto, Bellevue, WA (US)

(73) Assignee: CELLAR DOOR MEDIA, LLC, Tacoma, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/542,233

(22) Filed: Dec. 3, 2021

(65) Prior Publication Data

US 2022/0094539 A1    Mar. 24, 2022

Related U.S. Application Data

(63) Continuation of application No. 16/261,443, filed on Jan. 29, 2019, now Pat. No. 11,212,096.

(51) Int. Cl.
*H04L 9/08* (2006.01)
*G06F 21/55* (2013.01)
(Continued)

(52) U.S. Cl.
CPC ............ *H04L 9/0897* (2013.01); *G06F 16/27* (2019.01); *G06F 21/552* (2013.01); *G06N 20/00* (2019.01);
(Continued)

(58) Field of Classification Search
CPC ... H04L 9/0897; H04L 9/0877; H04L 9/0827; G06F 16/27; G06F 21/552;
(Continued)

(56) References Cited

U.S. PATENT DOCUMENTS 8,494,168 B1    7/2013   Tollmans
11,212,096 B2 *  12/2021  Teitzel ................. H04L 9/0897
(Continued)

FOREIGN PATENT DOCUMENTS

CN          101022333 A      8/2007
JP         2011-165125 A     8/2011
(Continued)

*Primary Examiner* — Christopher A Revak
(74) *Attorney, Agent, or Firm* — Seed Intellectual Property Law Group LLP

(57) ABSTRACT

A hosted secrets management transport system and method for managing secrets at one or more offsite locations that facilitates secret flow, secret retrieval, and secret replication. The method includes defining boundaries for two or more sovereignties, each sovereignty having an independent master record and each sovereignty including two or more regions; defining a primary region within the two or more regions; accessing, within the primary region, a master record hardware security module that is a primary source of secrets; defining a second region; accessing, within the second region, a backup record hardware security module that is where data backups of the secrets from the master record hardware security module are created; and executing live replication from the master record hardware security module to the backup record hardware security module in which the live replication that supports multi-tenancy secret management of multiple distinct companies at the same time.

40 Claims, 8 Drawing Sheets

(51) Int. Cl.
*G06F 16/27* (2019.01)
*G06N 20/00* (2019.01)

(52) U.S. Cl.
CPC .............. *G06F 2206/1012* (2013.01); *G06F 2221/034* (2013.01); *G06F 2221/2101* (2013.01)

(58) Field of Classification Search
CPC ....... G06F 2206/1012; G06F 2221/034; G06F 2221/2101; G06F 21/45; G06F 21/602; G06F 2221/2131; G06N 20/00
See application file for complete search history.

(56) References Cited

U.S. PATENT DOCUMENTS

| | | |
|---|---|---|
| 2004/0230797 A1 | 11/2004 | Ofek et al. |
| 2009/0292914 A1 | 11/2009 | Liu et al. |
| 2012/0303776 A1 | 11/2012 | Ferris |
| 2013/0326233 A1 | 12/2013 | Tollmans |
| 2015/0012710 A1 | 1/2015 | Liang et al. |
| 2015/0016172 A1 | 1/2015 | Loh et al. |
| 2015/0019870 A1 | 1/2015 | Patnala et al. |
| 2016/0156671 A1 | 6/2016 | Cabrera et al. |
| 2017/0048714 A1 | 2/2017 | Attfield et al. |
| 2018/0232526 A1* | 8/2018 | Reid .................... H04L 9/3213 |
| 2018/0254901 A1 | 9/2018 | Egorov et al. |
| 2019/0057028 A1* | 2/2019 | D'Halluin .............. G06F 16/27 |
| 2021/0182310 A1 | 6/2021 | Shiell et al. |
| 2021/0200771 A1 | 7/2021 | Kuang et al. |
| 2022/0060317 A1* | 2/2022 | Ponnuswamy ....... G06F 21/602 |
| 2022/0311757 A1* | 9/2022 | Balasubramanian ....................... H04L 9/0877 |

FOREIGN PATENT DOCUMENTS

| | | |
|---|---|---|
| WO | 2012/040231 A2 | 3/2012 |
| WO | 2020/159774 A1 | 8/2020 |

* cited by examiner

API AND ENCRYPTION KEY SECRETS MANAGEMENT SYSTEM AND METHOD

TECHNICAL FIELD

The present disclosure generally relates to secret management systems and methods, and particularly, to API and encryption key security management systems and methods.

BACKGROUND

Description of the Related Art

Internet security is one of the large areas of concern and potential liability in cyberspace, e-commerce, and the Internet in general. There are many types of potential vulnerabilities that may be exploited by hackers or other malicious parties.

For example, increasingly, software applications, such as websites, are leveraging 3rd party APIs. In many systems, APIs, passwords, secret keys, credentials, cryptographic keys, and other secrets are stored in an application's code repository and database. In such systems, there is nothing to prevent an application's keys from being used outside of the website. If an application is hacked, usually the first thing the hacker does is make a copy of the environment. This means that the hacker takes a copy of the application database if the hack is a SQL exploit or the hacker takes a copy of the server if the hack is a server breach. As such, secrets can be lost and the data and services they protect compromised.

There is a major need to secure sensitive data, web transactions, and communications by removing these API keys from an application's code repository or database, encrypting them, and storing them safely in an isolated system. This limits the damage that may be done if an application is compromised, or a developer has a local copy of an application's code repository or database.

Another problem that arises in the application development and hosting world is the problem of having production data decrypted in a development environment. This may occur due to the actions of a malicious developer or other individual. Alternatively, this may happen by accident, if a developer does not know how to isolate production secrets. Also, as an example, they can inadvertently trigger 3rd party production services, such as send a test notification from development to production users.

Furthermore, still another problem that arises in the application development and hosting world is the need to be able to control where data is geographically located when the data is stored in the cloud. Typically, when companies store their data in a managed cloud, they have little control over where their data is being stored, which may be problematic due to security issues, regulatory issues, and/or other issues.

There is a continuing need in the art for a secrets management technology that provides security on the Internet and various applications.

BRIEF SUMMARY

In accordance with some implementations, a hosted secrets management transport system for managing secrets at one or more offsite locations is disclosed. In some such implementations, the system includes two or more sovereignties that are larger functional groupings of components. In one or more implementations, each sovereignty has an independent master record, and each sovereignty includes two or more regions; a primary region and any number of secondary regions. In some implementations, the hosted secrets management transport system also includes a master record hardware security module in the primary region of each sovereignty that is the primary storage of secrets for that sovereignty. The master record hardware security module is a truth record for all actions on secrets within its corresponding sovereignty. In some such implementations, the actions of secrets include one or more of creation actions, update actions, and deletion actions.

In another aspect of some implementations, the hosted secrets management transport system further includes a backup record hardware security module in a secondary of the two or more regions that is not the primary region of the sovereignty. In one or more implementations, the backup record hardware security module receives live replication from the master record hardware security module. The backup record hardware security module is where data backups are created from the master record hardware security module of the sovereignty. In still another aspect of some implementations, the hosted secrets management transport system includes a primary cache hardware security module, contained in each of the two or more regions, which receives live replication from the backup record hardware security module. In yet another aspect of some implementations, the hosted secrets management transport system includes a hardware security module cache pool that is contained in each of the two or more regions. Each hardware security module cache pool is scalable to replicate from its corresponding primary cache hardware security module, depending on traffic needs within a region.

In some implementations, the hosted secrets management transport system further includes a cluster of software containers and a software container management system included in each of the two or more regions. The software container management system ensures the software containers are available and operating properly. In this manner, requests from software containers in the cluster of a region are load balanced amongst the primary cache hardware security module and the hardware security module cache pool for all reads. In one or more implementations, when a value is requested the system identifies the originating sovereignty of the value and, if different than the request originating sovereignty and permissible, makes a request to the originating sovereignty for the value, which is then cached in the primary cache hardware security module of the region in which the request originated. The value is then distributed to the hardware security module cache pool via replication.

In some implementations of the hosted secrets management transport system, the sovereignties are defined based on geopolitical boundaries. The geopolitical boundaries may include, by way of example only, and not by way of limitation: countries, unions of countries, or groups of countries. In other implementations of the hosted secrets management transport system, the sovereignties are defined based arbitrarily to organize regions and keep secrets bound to a single group, company, or enterprise. In another aspect of some implementations of the hosted secrets management transport system, the regions are defined by real-world boundaries that include regional directions (East, West, North, and South) or countries with a sovereignty. In other implementations of the hosted secrets management transport system, the regions are based entirely or partially on unique datacenters that are contained within one or more of a same cloud provider, different cloud providers, on-premises systems, and private clouds.

In one or more implementations, the secondary region provides for high availability in the event the entire primary region is rendered unavailable. In another aspect of some implementations of the hosted secrets management transport system, the master record is where all write actions occur. In still another aspect of some implementations of the hosted secrets management transport system, no read actions occur on the master record except during emergency situations. In yet another aspect of some implementations of the hosted secrets management transport system, the backup record hardware security module keeps loads on the master record hardware security module as low as possible, to reduce or eliminate a possibility of a database lock occurring. In some implementations of the hosted secrets management transport system, the primary cache hardware security module serves as a primary replication source for all cached values in its corresponding region.

In another aspect of some implementations, the hosted secrets management transport system securely distributes the replicated values amongst the sovereignties to provide reduced request latency, and distributes replicated values through the primary cache hardware security modules and hardware security module cache pools, while the master record hardware security modules of the corresponding sovereignties always contain original values. In some implementations of the hosted secrets management transport system, one region is designated with a primary database cluster, wherein data is stored in the primary database cluster. From the primary database cluster, the data is replicated globally to distributed replica databases located in each region. In one or more implementations of the hosted secrets management transport system, the data stored in the primary database cluster is metadata, of the secrets managed in the system, including one or more of: name, internal name, version numbers, originating sovereignty, and security policies guarding where the values are able to be distributed. In some implementations of the hosted secrets management transport system, the data is stored as a stream of events that are rendered to build a metadata entity, rather than storing the metadata as a single entity. In such an embodiment, the stream of events provides a persistent audit log of all events that result in mutating actions being taken. In one or more implementations of the hosted secrets management transport system, events in the persistent audit log are analyzed for anomalies and security issues using machine learning.

In some implementations of the hosted secrets management transport system, a client is created by a user and bound to a KeyRing, while restricting access to a specific environment's values, ensuring that values in various environments, such as production and development, are not crossed. In some implementations of the hosted secrets management transport system, a client is bound to an environment. In some such implementations of the hosted secrets management transport system, different types of environments include, by way of example only, and not by way of limitation: Production, Staging, Testing, and Development.

In some implementations of the hosted secrets management transport system, every region includes a private subnet. In some such implementations, all of the components in a region are located in private subnets within various availability zones, which eliminates any possibility of a direct contact via an external connection to the Internet.

In another aspect of some implementations, all communication between regions and communication between sovereignties are handled by encrypted connections, such as virtual private network connections, for added security.

In another implementation of the hosted secrets management transport method, the method manages secrets at one or more offsite locations. The method includes: defining boundaries for two or more sovereignties that are larger functional groupings of components, each sovereignty having an independent master record, wherein each sovereignty includes two or more regions; defining a primary region within the two or more regions; accessing, within the primary region, a master record hardware security module that is a primary source of secrets, wherein the master record hardware security module is a truth record for all actions on secrets within its corresponding sovereignty, the actions on the secrets including one or more of creation actions, update actions, and deletion actions; defining an off-region of the two or more regions that is not the primary region; accessing, within the off-region, a backup record hardware security module that is where data backups of the secrets from the master record hardware security module are created; executing live replication from the master record hardware security module to the backup record hardware security module; accessing, in each of the two or more regions, a primary cache hardware security module that receives live replication from the backup record hardware security module; accessing, in each of the two or more regions, a hardware security module cache pool, wherein the hardware security module cache pool is scalable to replicate from the primary cache hardware security module depending on the traffic needs within a region; accessing, in each of the two or more regions in a sovereignty, a cluster of software containers and a software container management system that ensures the software containers are available and operating properly; and receiving a request for values at a software container, wherein the request for values from the software containers in the cluster of a region are load balanced amongst the primary cache hardware security module and the hardware security module cache pool for all reads; wherein, when a value is requested, the system looks up an originating sovereignty of the value and, if different than the request originating sovereignty and permissible, makes a request to the originating sovereignty for the value, which is then cached in the primary cache hardware security module of the region in which the request originated, wherein the value is then distributed to the hardware security module cache pool via replication.

In some implementations of the hosted secrets management transport method, the sovereignties are defined based on geopolitical boundaries. The geopolitical boundaries may include, by way of example only, and not by way of limitation: countries, unions of countries, or groups of countries. In other implementations of the hosted secrets management transport method, the sovereignties are defined based arbitrarily to organize regions and keep secrets bound to a single group, company, or enterprise. In another aspect of some implementations of the hosted secrets management transport method, the regions are defined by real-world boundaries that include regional directions (East, West, North, and South) or countries with a sovereignty. In other implementations of the hosted secrets management transport method, the regions are based entirely or partially on unique datacenters that are contained within one or more of a same cloud provider, different cloud providers, on-premises systems, and private clouds.

In one or more implementations, the secondary region provides for high availability in the event the entire primary region is rendered unavailable. In another aspect of some implementations of the hosted secrets management transport method, the master record is where all write actions occur. In still another aspect of some implementations of the hosted secrets management transport method, no read actions occur on the master record except during emergency situations. In yet another aspect of some implementations of the hosted secrets management transport method, the backup record hardware security module keeps loads on the master record hardware security module as low as possible, to reduce or eliminate a possibility of a database lock occurring. In some implementations of the hosted secrets management transport method, the primary cache hardware security module serves as a primary replication source for all cached values in its corresponding region.

In another aspect of some implementations, the hosted secrets management transport method securely distributes the replicated values amongst the sovereignties to provide reduced request latency, and distributes replicated values through the primary cache hardware security modules and hardware security module cache pools, while the master record hardware security modules of the corresponding sovereignties always contain original values. In some implementations of the hosted secrets management transport method, one region is designated with a primary database cluster, wherein data is stored in the primary database cluster. From the primary database cluster, the data is replicated globally to distributed replica databases located in each region. In one or more implementations of the hosted secrets management transport method, the data stored in the primary database cluster is metadata, of the secrets managed in the method, including one or more of: name, internal name, version numbers, originating sovereignty, and security policies guarding where the values are able to be distributed. In some implementations of the hosted secrets management transport system, the data is stored as a stream of events that are rendered to build a metadata entity, rather than storing the metadata as a single entity. In such an embodiment, the stream of events provides a persistent audit log of all events that result in mutating actions being taken. In one or more implementations of the hosted secrets management transport system, events in the persistent audit log are analyzed for anomalies and security issues using machine learning.

In some implementations of the hosted secrets management transport method, a client is created by a user and bound to a KeyRing, while restricting access to a specific environment's values, ensuring that values in various environments, such as production and development, are not crossed. In some implementations of the hosted secrets management transport method, a client is bound to an environment. In some such implementations of the hosted secrets management transport method, different types of environments include, by way of example only, and not by way of limitation: Production, Staging, Testing, and Development.

In some implementations of the hosted secrets management transport method, every region includes a private subnet. In some such implementations, all other components in a region are located in private subnets within various availability zones, which eliminates any possibility of a direct contact via an external connection to the Internet. In another aspect of some implementations, all communication between regions and communication between sovereignties are handled by encrypted connections, such as virtual private network connections, for added security.

In one or more other implementations, a hosted secrets management transport system is disclosed for managing secrets at one or more offsite locations. In some such implementations, the system includes two or more sovereignties that are larger functional groupings of components. In one or more implementations, each sovereignty with an independent master record, and each sovereignty includes two or more regions that further include at least a primary region and a secondary region. In some implementations, the hosted secrets management transport system also includes a master record hardware security module in the primary region of each sovereignty that is a primary storage of secrets for that sovereignty. The master record hardware security module is a truth record for all actions on secrets within its corresponding sovereignty. In some such implementations, the actions on secrets including one or more of creation actions, update actions, and deletion actions.

In another aspect of some implementations, the hosted secrets management transport system further includes a backup record hardware security module in one or more secondary regions that is not the primary region of the sovereignty. In one or more implementations, the backup record hardware security module receives live replication from the master record hardware security module that supports multi-tenancy secret management of multiple distinct companies at a same time. In one or more implementations, the backup record hardware security module is where data backups are created from the master record hardware security module.

In still another aspect of some implementations, the hosted secrets management transport system includes a primary cache hardware security module, contained in each of the two or more regions, that receives live replication from the backup record hardware security module. In yet another aspect of some implementations, the hosted secrets management transport system includes a hardware security module cache pool that is contained in each of the two or more regions. Each hardware security module cache pool is scalable to replicate from its corresponding primary cache hardware security module depending on traffic needs within a region.

In some implementations, the hosted secrets management transport system further includes a cluster of software containers and a software container management system included in each of the two or more regions. The software container management system ensures the software containers are available and operating properly. In this manner, requests from software containers in a cluster of a region are load balanced amongst the primary cache hardware security module and the hardware security module cache pool for all read actions.

In one or more implementations, when a value is requested that is not present, the system identifies an originating sovereignty of the value and, if different than the request originating sovereignty and permissible, makes a request to the originating sovereignty for the value, which is then cached in the primary cache hardware security module of the region in which the request originated. The value is then distributed to the hardware security module cache pool via live replication.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

DETAILED DESCRIPTION

Figure 1:
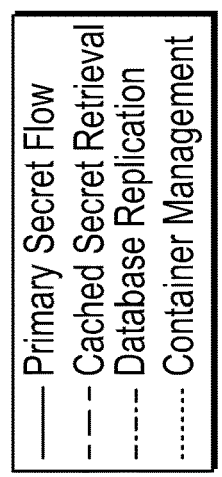
FIG. 1 is a schematic diagram that shows the hosted secrets management transport system, including multiple sovereignties and multiple regions contained therein, in which the system facilitates secret flow, secret retrieval, and secret replication.
Figure 1:
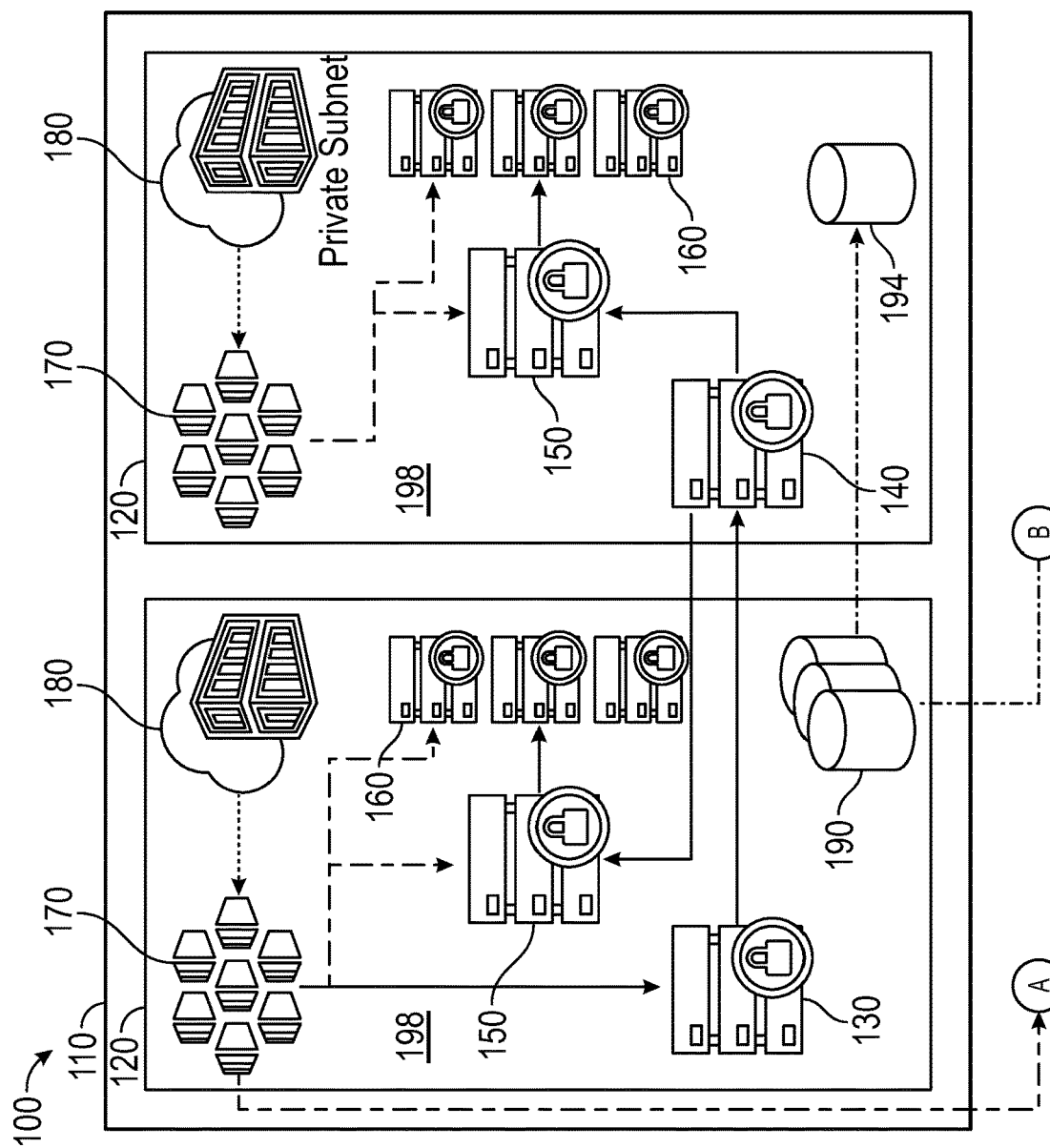
Figure 1:
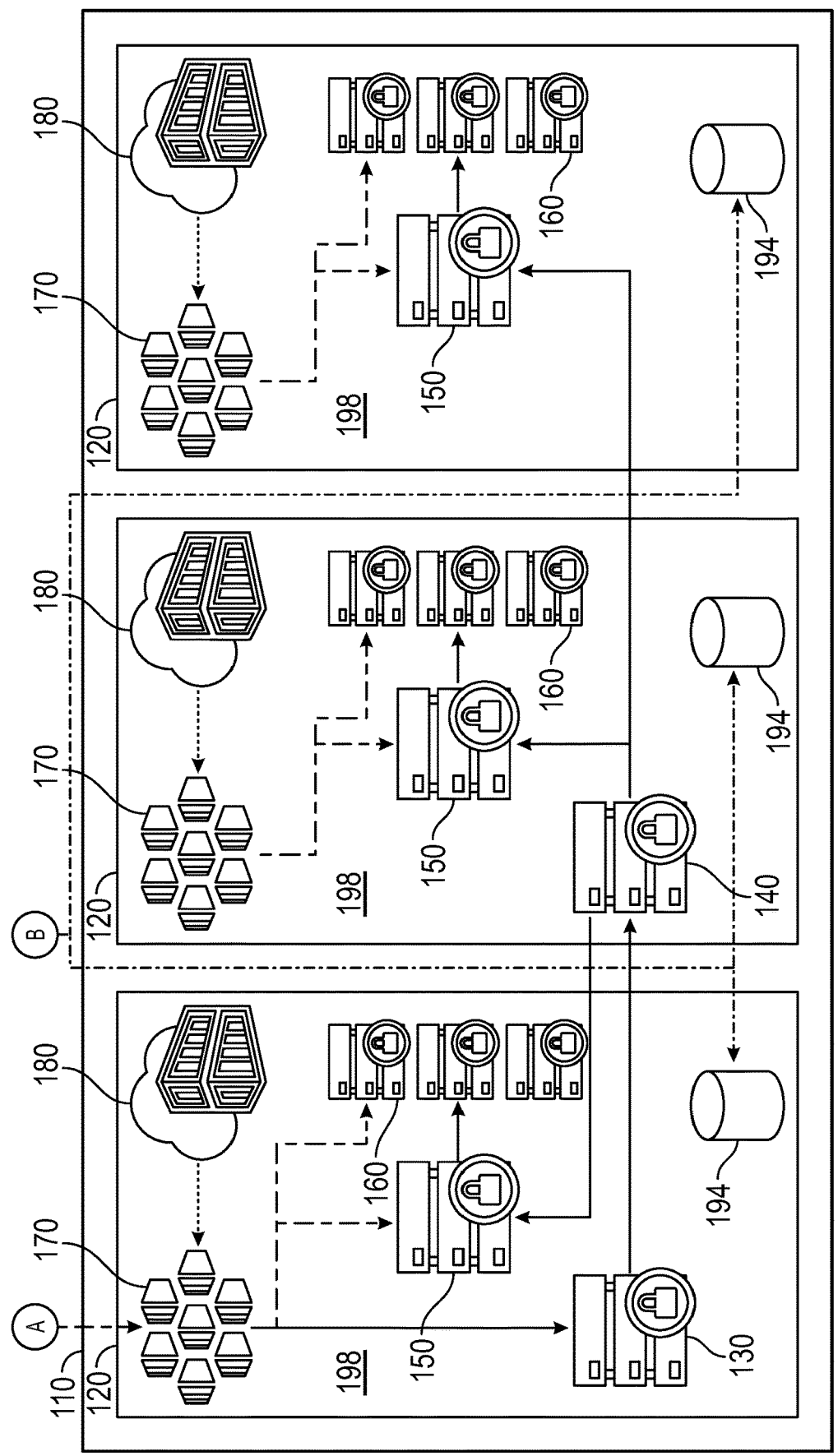

Persons of ordinary skill in the art will understand that the present disclosure is illustrative only and not in any way limiting. Each of the features and teachings disclosed herein can be utilized separately or in conjunction with other features and teachings to provide a hosted secrets management system and method. Representative examples utilizing many of these additional features and teachings, both separately and in combination, are described in further detail with reference to the attached figures. This detailed description is merely intended to teach a person of skill in the art further details for practicing aspects of the present teachings, and is not intended to limit the scope of the claims. Therefore, combinations of features disclosed in the detailed description may not be necessary to practice the teachings in the broadest sense, and are instead taught merely to describe particularly representative examples of the present teachings.

Some portions of the detailed descriptions herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities, and are merely convenient labels applied to these quantities. Unless specifically stated otherwise as apparent from the below discussion, it is appreciated that throughout the description, discussions utilizing terms such as "processing," "computing," "calculating," "determining," "displaying," "configuring," or the like, refer to the actions and processes of a computer system, or similar electronic computing device, that manipulate and transform data represented as physical (electronic) quantities within the computer system's registers and memories into other data similarly represented as physical quantities within the computer system memories or registers or other such information storage, transmission or display devices.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

Unless the context requires otherwise, throughout the specification and claims which follow, the word "comprise" and variations thereof, such as "comprises" and "comprising," are to be construed in an open, inclusive sense, that is, as "including, but not limited to." Reference throughout this specification to "one implementation" or "an implementation" means that a particular feature, structures, or characteristics may be combined in any suitable manner in one or more implementations.

As used in this specification and the appended claims, the singular forms "a," "an," and "the" include plural referents unless the content clearly dictates otherwise. It should also be noted that the term "or" is generally employed in its broadest sense, that is, as meaning "and/or" unless the content clearly dictates otherwise. The headings and Abstract of the Disclosure provided herein are for convenience only and do not interpret the scope or meaning of the implementations.

Disclosed herein is a hosted secrets management transport system and method 100 for modern content management systems (CMS), such as Drupal and WordPress, which enables applications to properly manage access to application secrets (e.g., API & encryption key management) in a secure offsite hosted environment. The hosted secrets management transport system and method 100 integrates into any application to provide a secure way to store values such as API tokens, passwords, and encryption keys. The hosted secrets management transport system and method 100 employs an offsite key management solution that protects against critical vulnerabilities, helps the application comply with many industry regulations (e.g., PCI DSS, HIPAA and other security requirements and regulations), and provides a Defense in Depth "multiple layer" approach to securing an application's data. In some implementations, the hosted secrets management transport system and method 100 provides AES-256 encryption to an application's custom plugins in a seamless manner to protect data at rest in an application, while delivering enterprise-grade HSM (Hardware Security Module) key management.

In some implementations, the hosted secrets management transport system and method 100 is an authentication, transport, and routing system that takes the encrypted values and routes them to an offsite location where they are stored encrypted at rest inside a HSM, provided by, for example, Townsend Security. The hosted secrets management transport system and method 100 provides application administrators with the ability to control how and where their sensitive keys are stored, thus improving the overall security of the application, and allowing the application to meet specific regulatory and compliance requirements for key management.

In one or more implementations, the hosted secrets management transport system and method 100 enables applications of all sizes to meet industry standards for key management with a managed scalable cloud key management system. Unlike other third-party key managers, the hosted secrets management transport system and method 100 offers additional layers of security and system monitoring. In some implementations, the hosted secrets management transport system and method 100 incorporates offsite API and encryption key management to help applications comply with HIPAA, FERPA, and FISMA. In some implementations, the hosted secrets management transport system and method 100 is automatically configured to secure API keys for numerous third-party plugins for seamless integration and securing of an application's keys. In one or more implementations of the hosted secrets management system and method 100, the system provides multiple region redundancy, platform agnostic rest API for universal integration, and region specific data isolation that enables an application's administrator to choose where its data is stored for data sovereignty.

In some implementations, the hosted secrets management transport system and method 100 isolates values for development environments and production environments from each other, in addition to storing an application's values in a secure encrypted HSM. This feature of the hosted secrets management transport system and method 100 provides several technological improvements. First, if an application administrator is encrypting values from a production environment with a key stored in the hosted secrets management system and method 100, those values are not be able to be decrypted in development environments. This is important in regulated environments where an application administrator needs to be able to control who has access to encrypted data. Second, the data isolation provided by the hosted secrets management transport system and method 100 prevents encrypted values from being compromised if an email is accidentally sent from a development environment to a production service. The hosted secrets management transport system and method 100 isolates an application's development environment by keeping the application's production tokens and keys away from developers.

Otherwise stated, the hosted secrets management transport system and method 100 manages keys on a "per environment" basis, which reduces or eliminates the potential of keys being shared from production to development environments. When using the hosted secrets management system and method 100, if sensitive information is encrypted in a production environment, that data may not be decrypted anywhere but in that production environment. In this scenario, the data is encrypted in production with a production key that is not retrievable outside that production environment. If a database is cloned to development, the keys that a CMS has access to cannot decrypt the data.

In some implementations, the hosted secrets management transport system and method 100 enables an administrative user of a company to select the geographical region in which to store the company's secrets (e.g., a user in the U.S. may wish to store their company's secrets in the U.S.). If an application administrator is located outside the United States, the hosted secrets management transport system and method 100 enables the application administrator to choose another available region to store its secrets. Since regions in the hosted secrets management transport system and method 100 are isolated, values set in one region are not available in any other region.

Referring to FIG. 1, one or more implementations of the hosted secrets management transport system and method 100 incorporate the use of multiple sovereignties 110 and multiple regions 120. Specifically, the hosted secrets management transport system and method 100 includes two or more sovereignties 110 that are larger functional groupings of components. In one or more implementations, each sovereignty 110 has an independent master record, and each sovereignty 110 includes two or more regions 120 that each further include at least a primary region 120 and a secondary region 120. In some implementations, sovereignties 110 may be drawn based on geopolitical boundaries (e.g., United States, European Union, or the like). In other implementations, sovereignties 110 may be drawn arbitrarily to organize regions 120 and keep secrets bound to a single group (e.g., a single company or enterprise). The regions 120 inside a sovereignty 110 may be described by real-world boundaries (e.g., East, West, countries within a sovereignty). Additionally, regions 120 inside a sovereignty 110 may by based on entirely unique datacenters (within the same cloud provider, different cloud providers, on-premises systems, private clouds, and the like). The primary region 120 and secondary region 120 (and potentially additional regions) within each sovereignty 110 provide for high availability in the event the entire primary region is rendered unavailable.

In some implementations, the hosted secrets management transport system 100 also includes a master record hardware security module 130 in the primary region 120 of each sovereignty 110, that is the primary source of secrets. The master record hardware security module 130 is a truth record for all actions on secrets within its corresponding sovereignty 110. In some such implementations, the actions of secrets include one or more of creation actions, update actions, and deletion actions. That master record hardware security module 130 is where all write actions occur. However, read actions do not occur at the master record hardware security module 130 except for during emergency scenarios.

In another aspect, the hosted secrets management transport system 100 further includes a backup record hardware security module 140 in a secondary region 120 of the sovereignty 110. In one or more implementations, the backup record hardware security module 140 receives live replication from the master record hardware security module 130. The backup record hardware security module 140 is where data backups are created from the master record hardware security module 130 of the sovereignty 110, which keeps the load on the master record hardware security module 130 as low as possible, to reduce or eliminate the possibility of a database lock occurring.

Referring now to another component, some implementations the hosted secrets management transport system include a primary cache hardware security module 150 contained in each of the two or more regions 120, which receives live replication from the backup record hardware security module 140. In yet another component of some implementations, the hosted secrets management transport system 100 includes a hardware security module cache pool 160 that is contained in each of the two or more regions 120. Each hardware security module cache pool 160 is scalable to replicate from its corresponding primary cache hardware security module 150, depending on traffic needs within a region 120. In some implementations, the primary cache hardware security module 150 serves as a primary replication source for all cached values in its corresponding region 120.

Referring now to still another component, some implementations the hosted secrets management transport system 100 further include a cluster of software containers 170 and a software container management system 180 included in each of the two or more regions 120. The software container management system 180 ensures that the software containers 170 are available and operating properly. In the hosted secrets management transport system 100, requests coming from the containers 170 within a region 120 are load balanced amongst the primary cache hardware security module 150 and the hardware security module cache pool 160 for all reads. Containers 170 are a method of operating system virtualization that enables an application and its dependencies to be run in resource-isolated processes. Containers 170 help ensure that applications deploy quickly, reliably, and consistently, regardless of the deployment environment.

In the hosted secrets management transport system 100, when a value is requested that is not present, the system 100 identifies an originating sovereignty 110 of the value. If different than the request originating sovereignty and permissible, the system makes a request to the originating sovereignty 110 for the value, which is then cached in the primary cache hardware security module 150 of the region 120 in which the request originated. The value is then distributed to the hardware security module cache pool 160 via replication. Due to this function, the hosted secrets management system 100 securely distributes the replicated values amongst the sovereignties 110 to provide reduced request latency, and distributes replicated values through the primary cache hardware security modules 150 and hardware security module cache pools 160, while the master record hardware security modules 130 of the corresponding sovereignties 110 always contain original values.

In some implementations of the hosted secrets management system 100, each of the two or more regions 120 includes a primary database cluster 190, in which data are stored. From the primary database cluster 190, the data are replicated globally to distributed replica databases 194. In one or more implementations of the hosted secrets management system 100, the data stored in the primary database cluster 190 is metadata of the secrets managed in the system including one or more of: name, internal name, version numbers, originating sovereignty, and security policies guarding where the values are able to be distributed. Rather than storing the metadata as a single entity, the data is stored as a stream of events. These events are then rendered to build the metadata entity, while the event stream gives a persistent audit log of all mutating actions taken in the system. This audit log allows for additional analyzing of the events for anomalies and security concerns using machine learning.

Figure 3:
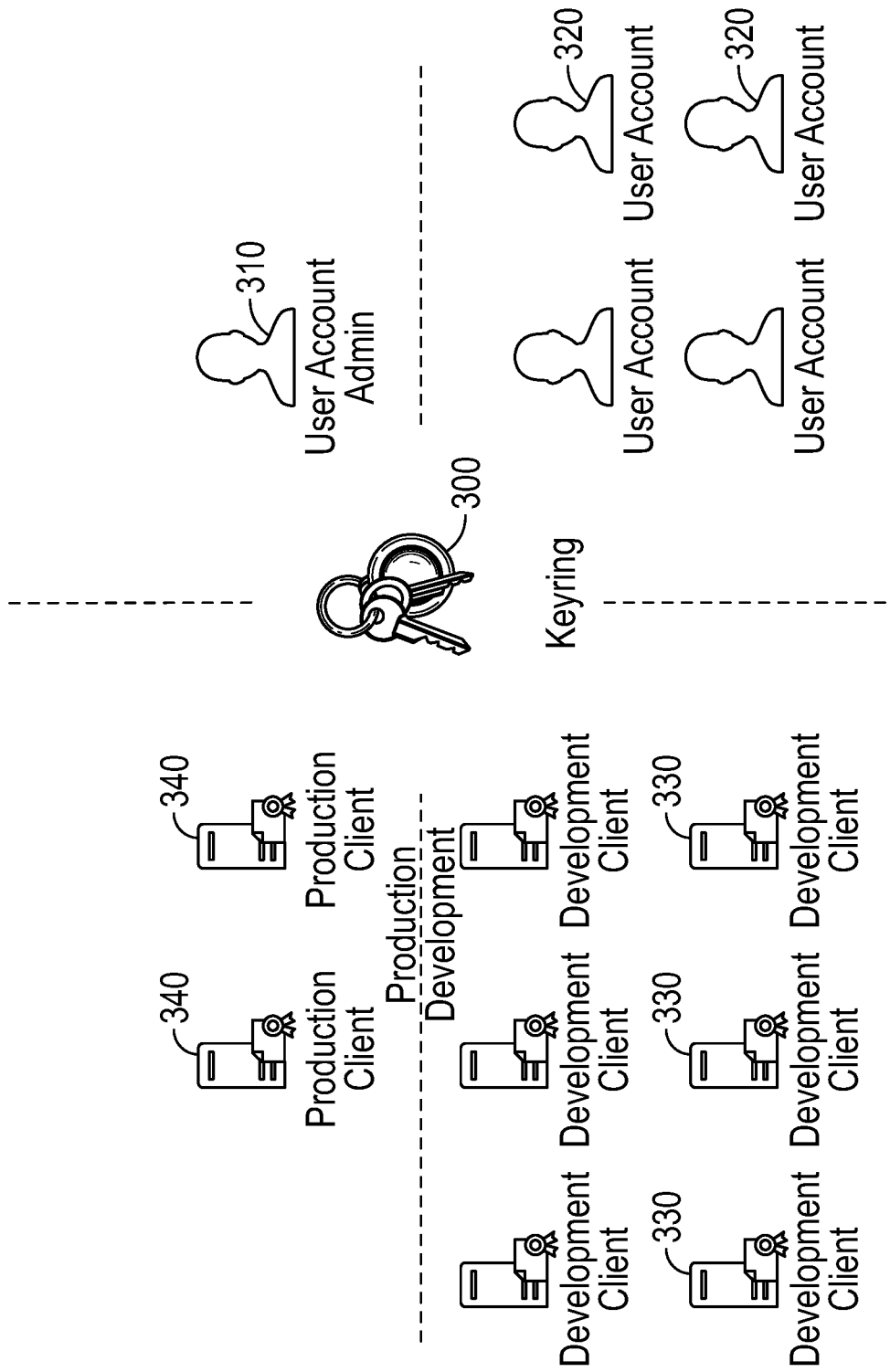
FIG. 3 is a schematic diagram that shows the relationships between the various KeyRings, clients, and users.
Figure 4:
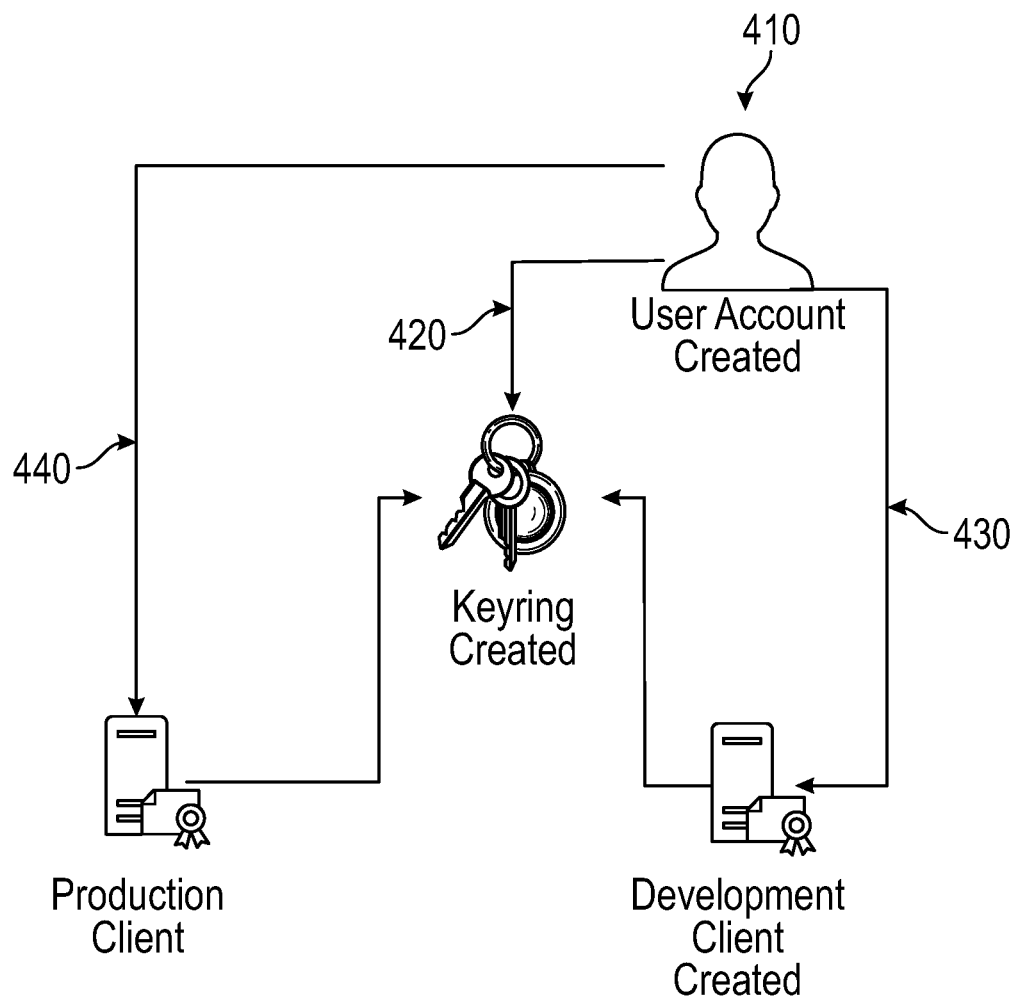
FIG. 4 is a schematic diagram that shows how user accounts, KeyRings, development clients, and production clients are created.

Referring now to FIGS. 3 and 4, in the hosted secrets management transport system 100, a client is created by a user and bound to a KeyRing, while restricting access to a specific environment's values, ensuring that values in various environments, such as production and development, are not crossed. In this manner, a client is bound to an environment in the hosted secrets management transport system 100. In the hosted secrets management transport system 100, different types of environments include, by way of example only, and not by way of limitation: Production, Staging, Testing, and Development.

Figure 2A:
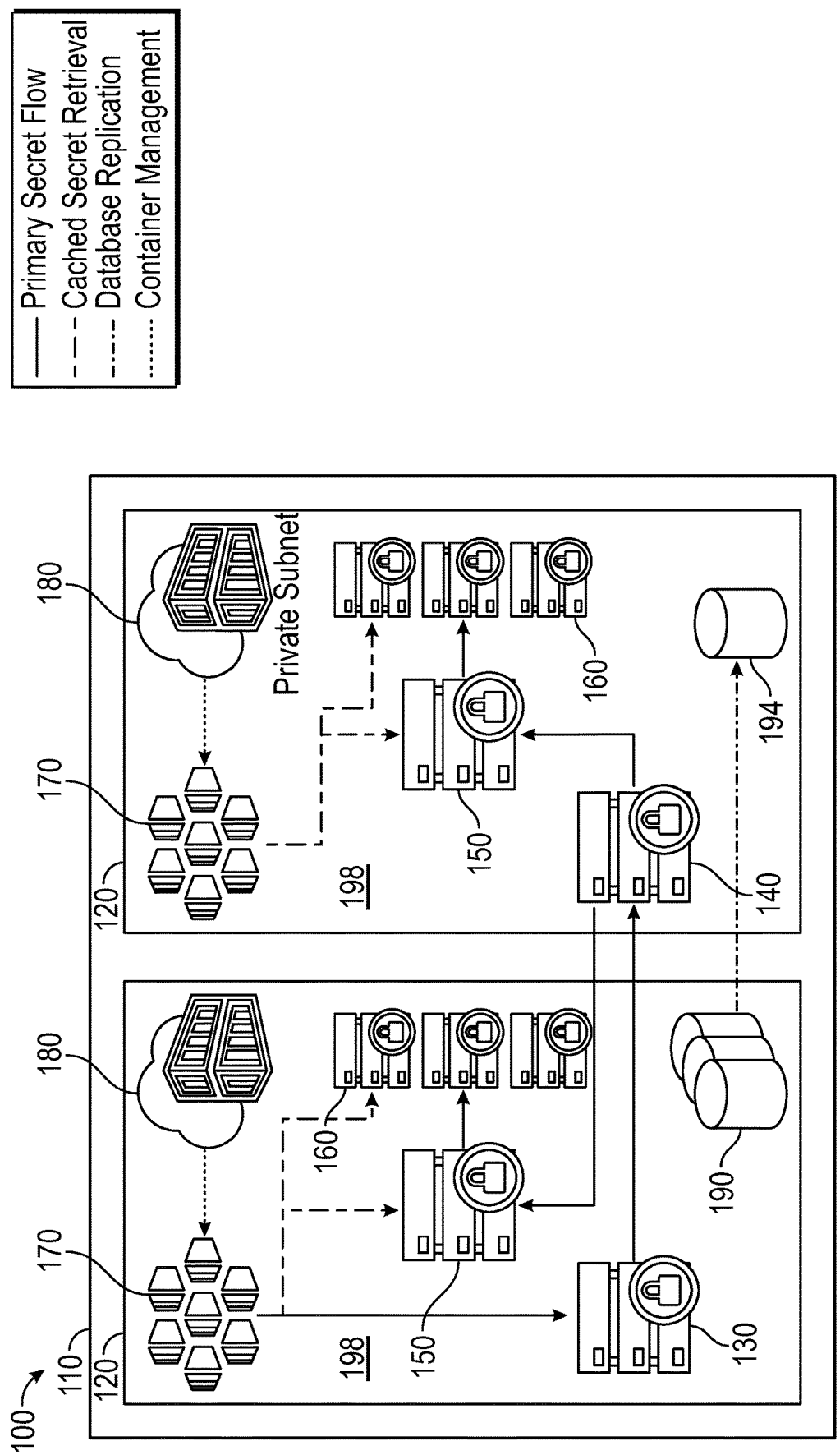
FIG. 2A is a schematic diagram that shows a portion of the hosted secrets management transport system, including a single sovereignty and multiple regions contained therein.
Figure 2B:
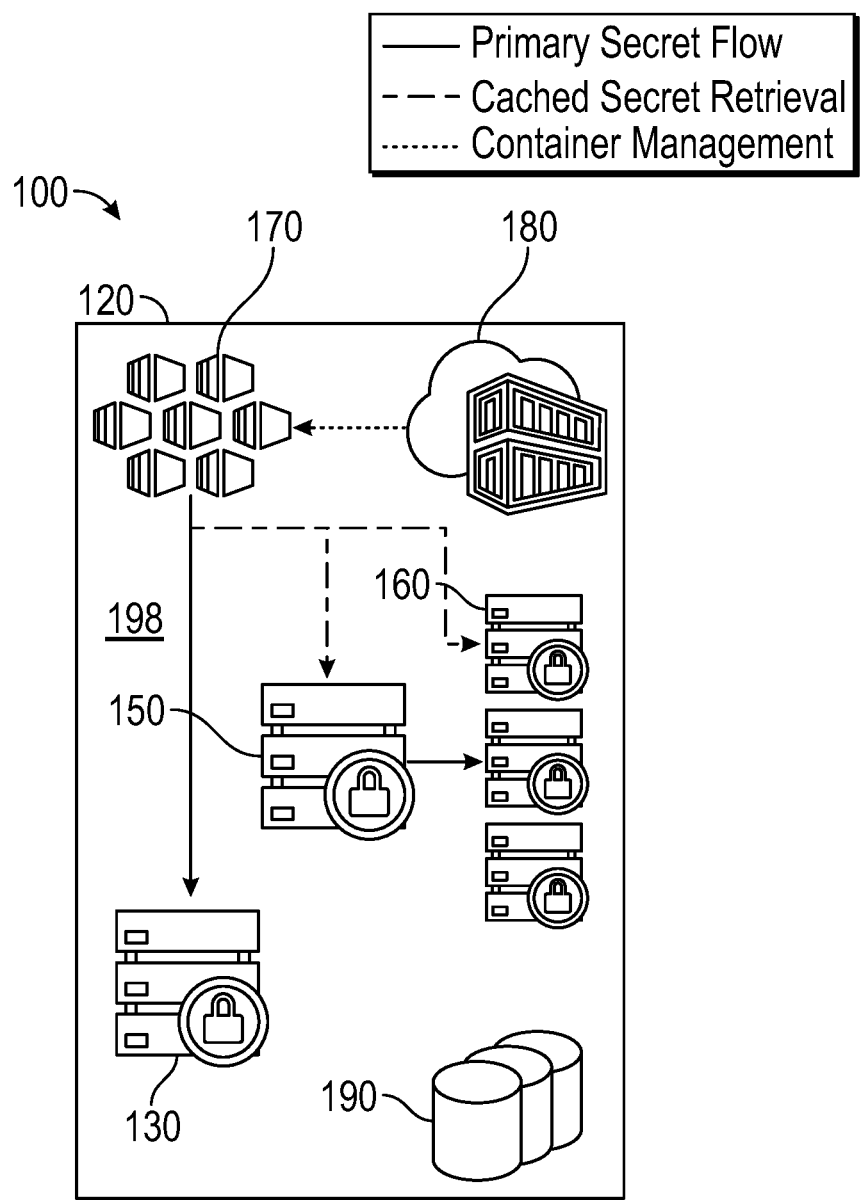
FIG. 2B is a schematic diagram that shows a portion of the hosted secrets management transport system including a single region.

Referring again to FIGS. 1, 2A, and 2B, in the hosted secrets management transport system 100, every region 120 includes a private subnet 198 In one or more implementations, the private subnet 198 includes the software containers 170 and the software container management systems 180. In some such implementations, all components in a region 120 are located in private subnets 198 within various availability regions 120, which eliminates any possibility of a direct contact via an external connection to the Internet. In another aspect, all communication between regions 120 and communication between sovereignties 110 are handled by private encrypted connections, for example via a Virtual Private Network connection, for added security.

Others have attempted to address the problems that are solved by the hosted secrets management transport system and method 100, but they have not been successful. Some such third-party attempts have a few similarities to the end function of the hosted secrets management transport system and method 100; however, the design and capabilities of the hosted secrets management transport system and method 100 are unique. For example, the hosted secrets management transport system and method 100 is a transport layer system that enables authentication, routing, and hosting, but does not provide storage. Significantly, the hosted secrets management transport system and method 100 enables the dynamical creation of restrictions on the passage of a secret within the system. Additionally, the hosted secrets management transport system and method 100 enables the ability to have different endpoints capable of distinct storage methods. Notably, the hosted secrets management transport system and method 100 is agnostic to the type of storage method and to the environment. Furthermore, the hosted secrets management transport system and method 100 enables arbitrary lines to be drawn in the creation of sovereignty boundaries, as well as enabling the creation of hybrid regions with multiple clouds for secrets management.

Some competing systems use Hardware Security Modules (HSMs) that employ default replication between a "primary" and any number of "secondary" devices/services. However, this type of default replication is done merely for performance and availability, since by distributing the secrets contained in the primary device out to secondary devices, the load of the system may be balanced based on location and/or outages of any one of the systems. However, this type of third-party replication is merely an all-or-nothing copying of the data. Otherwise stated, in this type of third-party replication, whatever is in the primary device is also replicated to the secondary device. When dealing with systems that bridge many various customers (e.g., companies) and locations all over the globe, with each country having its own data privacy legislation, this all-or-nothing replication approach is unacceptable.

Instead, the hosted secrets management transport system and method 100 creates what it defines as sovereignties 110. Each of these sovereignties 110 enables a grouping of regions 120 to be created within the corresponding sovereignty 110. Significantly, each of these sovereignties 110 enables data to be kept private to the sovereignty 110 in which it is set. While sovereignties 110 may be based on global boundaries, sovereignties 110 may also be virtual ones, to segregate the secrets of a specific organization or group of organizations. Each sovereignty 110 has a master record where all of its values and logs are retained to provide an audit trail of the secret. However, the hosted secrets management transport system and method 100 does not copy this data to all other sovereignties 110. Instead, the hosted secrets management transport system and method 100 enables "secret by secret" control of the distribution and transportation of the secrets, which may to used to keep the secrets of a first company separate from the secrets of a second company, both of which may be hosted on the region 120 of a sovereignty 110 in the system 100. In some implementations, this may be performed by using a white list of which sovereignties 110 the secret is allowed to be distributed to and which sovereignties 110 the secret is allowed to be cached in. Significantly, no permanent storage outside the originating sovereignty 110 is allowed by the hosted secrets management transport system and method 100.

This global caching enables the hosted secrets management transport system and method 100 to provide the performance benefits of global redundancy without requiring permanent storage, thereby allowing data "sovereignty" to be maintained. This intricate system of permissions on a "secret by secret" basis that is provided by the hosted secrets management transport system and method 100 enables the system to securely provide multi-tenancy (i.e., support multiple distinct companies at the same time) while keeping each secret and each user compliant with the data regulations of the jurisdictions in which they are located. This is particularly noteworthy since new regulations such as the General Data Protection Regulation (GDPR) result in users in the European Union potentially having different data regulations than users in the United States.

In addition to the ability to restrict secrets dynamically and individually, the hosted secrets management transport system and method 100 also provides the unique ability to have each region 120 within a sovereignty 110 have storage methods independent of the particular sovereignty 110 or larger system. In this manner, the hosted secrets management transport system and method 100 enables each region 120 to utilize the hardware and services of the environment in which it is located, while other regions 120 in the sovereignty 110 may utilize different hardware and services. This storage method independence of the hosted secrets management transport system and method 100 is transparent to the end user. Thus, end users do not have to change their methods, API interface, or the like, for different storage types.

While some competitors allow for storage across different "key stores," those secrets are name-spaced, or restricted by the name of the value, to the key store in which they are located and restrict access within any cluster to only the storage methods available within it.

Otherwise stated, the end user has to know the type of storage in which the secret is located, in order to retrieve the secret. Significantly, in the hosted secrets management transport system and method 100, values may be set in one region 120 (or sovereignty 110) and retrieved in another region 120 (or sovereignty 110). Furthermore, in the hosted secrets management transport system and method 100, a value may be stored in one region 120 in a first storage method and another value may be stored in second region 120 in a second storage method within the same sovereignty 110. This storage flexibility of the hosted secrets management transport system and method 100 enables each region 120 to run to the requirements of the individual region 120, and not run to the requirements network-wide, which is what is required for standard primary device to secondary device replication that is used in some third-party systems.

In addition to the storage method independence of the hosted secrets management transport system and method 100, the hosted secrets management transport system and method 100 is also environmentally independent. Otherwise stated, the hosted secrets management transport system and method 100 can operate in any environment, and a value may be stored in one region 120 in a first environment while another value may be stored in second region 120 in a second environment within the same sovereignty 110.

The core of the authentication and routing layer of the hosted secrets management transport system and method 100 may operate in any operating system based on Linux capable of running software programs that performs operating-system-level virtualization, also known as containerization. These operating systems include, by way of example only, and not by way of limitation: Ubuntu, RedHat, CentOS, and Oracle Linux. These operating systems are found in all of the major cloud infrastructure providers, such as: Amazon Web Services, Azure, Google Cloud Platform, IBM Cloud, and Rackspace.

While the hosted secrets management transport system and method 100 is particularly applicable to secure websites, the system has broad applicability beyond secure websites. The hosted secrets management transport system and method 100 may also be employed for secrets management in enterprise software, as well as for internal software within a corporate network. Additionally, the hosted secrets management transport system and method 100 may be employed in other technology-driven processes in an enterprise system. In some implementations, the hosted secrets management transport system and method 100 may be employed in secrets management and utilized in a non-technical enterprise, such as in a production line where software is being loaded onto a hardware device. In other implementations, the hosted secrets management transport system and method 100 may be employed in secrets management and utilized in a non-technical enterprise, such as in a factory where automobiles are created and loaded with software. With the proliferation of the Internet of Things (IoT), many Internet-connected devices require the ability to securely connect with and transfer information to the service provider that is operating them. These secrets may be stored locally on the Internet-connected devices; however, such local storage may create issues when such an Internet-connected devices system is compromised.

Instead, the hosted secrets management transport system and method 100 enables the Internet-connected devices to be shipped without the secrets they need to operate, and then be granted access to the secrets after arrival at their end user location. In this implementation of the hosted secrets management transport system and method 100, access to the secrets to which the Internet-connected devices were granted access may be revoked at any time.

Referring now FIG. 3, a KeyRing 300 of the hosted secrets management transport system and method 100 is shown. A KeyRing 300 is where the secrets are grouped together into environments, by way of example only and not by way of limitation: development, and production. Only the admin account user 310 may change information on the KeyRing 300 such as billing level, name of the KeyRing, and give permission to user accounts 320 to create development clients 330. Development clients 330 may be created by anyone with access to the KeyRing 300 as designated by the admin account user 310. Production clients 340 may only be created by an authenticated request by the admin account user 310 and with the development client 330 to create the request, thus providing a third point of authentication since the user authentication has two-factor authentication which can be done, by way of example only, and not by way of limitation: via a time-based one-time password algorithm or via SMS message to a registered device.

Referring now FIG. 4, to create a KeyRing 300 in the hosted secrets management transport system and method 100, the following process may be implemented: at 410 a user account 320 is created; at 420 via authenticating a user account 320, a KeyRing 300 is created; at 430 via authenticating a user account 320, a client is created allowing connection to the KeyRing 300 for a development environment; and at 440 via authenticating a user account, and via two-factor authentication, a client is created that allows access to the production secrets on the KeyRing 300. In this implementation, the client is created by using the development certificate as a third source of authentication.

Figure 5:
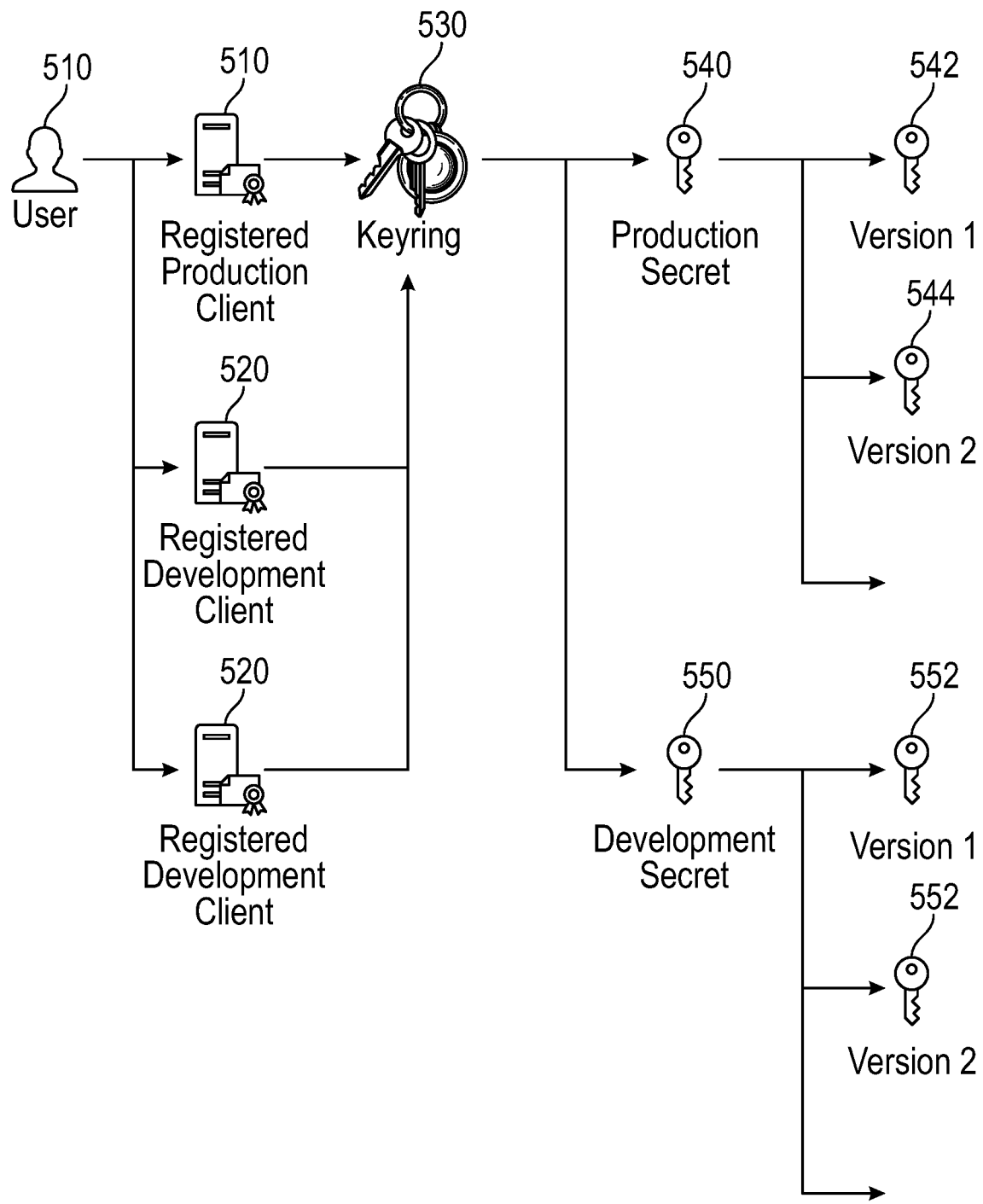
FIG. 5 is a schematic diagram that shows the secrets storage process involving users, production clients, development clients, KeyRings, production secrets, development secrets, and multiple versions thereof.

FIG. 5 further demonstrates the technological uniqueness of the hosted secrets management transport system and method 100 in contrast to other third-party systems. As shown in FIG. 5, a user account may be created by authenticating a user 510. That user 510 may be associated with a KeyRing 530 by registered production client 510, registered production client 520, and registered development client 530. In one or more implementations, the registered production client 510 may then use the KeyRing 530 to access a production secret 540. In another aspect of one or more implementations, the registered development client 530 may then use the KeyRing 530 to access a development secret 550. In some implementations, the hosted secrets management transport system and method 100 may save different versions (e.g., Version-1 542, Version-2 544) of the same production secret 540. In another aspect of some implementations, the hosted secrets management transport system and method 100 may save different versions (e.g., Version-1 552, Version-2 554) of the same development secret 550.

Notably, in the hosted secrets management transport system and method 100, the clients have built-in permissions and identity that cannot be changed. Otherwise stated, clients in the hosted secrets management transport system and method 100 are registered for specific environments from the time of their creation. Problematically, other third-party systems enable a user to be created and then later given additional permissions. However, such third-party systems are prone to permission escalation attacks that enable access to new secrets from different environments. In this type of attack, someone with improper access to the main system (e.g., a hacker) elevates the privileges of a user to an environment for which the user was not supposed have permissions.

Significantly, the unique architecture of the hosted secrets management transport system and method 100 secures the identity and permissions into the client when the client is created, so the identity and permissions of the client cannot be changed at any point in the future. Otherwise stated, the hosted secrets management transport system and method 100 forces the identity and the permission into the client as part of the cryptographic signature, so it cannot be changed at any point, thereby eliminating this type of attack. This is a technological improvement that enables the hosted secrets management transport system and method 100 to create a shared system where the users are from different groups that cannot cross over one another.

Notably, in some implementations of the hosted secrets management transport system and method 100, the system stores multiple versions of the keys under the namespace of the main secret. This technological improvement enabled by the hosted secrets management transport system and method 100 provides the capability to have multiple versions of the same secret all accessed under a single secret name. In this regard, the hosted secrets management transport system and method 100 enables the user to set the value of the various versions of the secret.

Some other third-party systems allow for an undesirable type of "versions," in which one must name the key versions as secret-v1, secret-v2, and the like. Additionally, still other third-party systems sometimes allow for instances and versions, but they are stored horizontally and are part of a "key rolling" procedure, in which a new key is programmatically created and linked to the previous key, rather than being created by user input. In contrast, the hosted secrets management transport system and method 100 enables a user to have control over the key versions and their values. Additionally, the versioning that is supported by the hosted secrets management transport system and method 100 enables two different users to use the same secret, and if one user updates the secret, the other user is not impacted.

In one or more implementations, the hosted secrets management transport system and method 100 deploys multiple layers of encryption in order to protect secrets. The first layer of encryption happens before the value even leaves a user's application. In some implementations, the hosted secrets management transport system and method 100 takes the encrypted value to be stored, and sends it over a secure, encrypted connection to the servers in the hosted secrets management transport system and method 100. Once in the hosted secrets management transport system and method 100, the encrypted value is routed to and stored encrypted at rest inside a HSM (Hardware Security Module), provided by, for example, Townsend Security. This is "end to end encryption" since the value that is sent to the hosted secrets management transport system and method 100 is encrypted, and only able to be decrypted where it started.

Neither hosted secrets management transport system and method 100, nor anyone else, can at any time view, modify, or lose the encrypted value. In one implementation, when an application needs the key for an encryption/decryption or API request, the hosted secrets management transport system and method 100 uses a partnering hosting provider server's certificate to authenticate on the user's behalf, and release the key. In this manner, the credentials used to access the hosted secrets management transport systems and methods 100 are provided by the application host or application platform to prevent hijacking and tampering.

Using a process called key wrapping, keys are rendered useless from being used outside the website, or application, environment. In the key wrapping process, one value is taken and encrypted (wrapped) using a second key. The hosted secrets management transport system and method 100 takes the second key, usually termed the KEK (key encryption key) and stores it in the application in place of the original value. This KEK does not have any function outside securing the value stored in the hosted secrets management transport system and method 100 so it is safe to store on the application. Anyone gaining access to this key still does not have the original value, and since they are not related or a derivation of the value, so it is useless to an attacker.

This prevents keys stored by the hosted secrets management transport system and method 100 from being viewed or compromised by adding another layer of security to the process. In some implementations, the hosted secrets management transport system and method 100 employs Townsend Security's FIPS 140-2 compliant key manager to secure the keys to the highest of industry standards. In some implementations, the hosted secrets management transport system and method 100 encrypts the value to be stored using AES 256 bit CBC encryption with a SHA256 HMAC.

One technological improvement of the hosted secrets management transport system and method 100 is that system is configured to work with numerous current and anticipated storage technologies. In some implementations, the hosted secrets management transport system and method 100 uses Hardware Security Modules, either physical or cloud based, to store the secrets securely at rest in the system to provide the highest level of protection. Any Hardware Security Module used in conjunction with hosted secrets management transport system and method 100 is at a minimum of NIST 140-2 compliant, which enables an industry best practice of storage in an encrypted and secure environment. Additionally these Hardware Security Modules may hold certificates of compliance with global regulations such as PCI-DSS, HIPAA, the GDPR and others.

In other implementations, the hosted secrets management transport system and method 100 uses non-Hardware Security Module storage methods, which are encrypted at rest and provide a basic level of security for secrets not needing to meet regulatory compliance. These storage methods would be industry vetted and advertised as non-Hardware Security Module, or potentially non-compliant, storage methods.

The hosted secrets management transport system and method 100 operates on authentication via x.509 certificates issued from the Hardware Security Modules, or a common Certificate Authority trusted by the hosted secrets management transport system and method 100. These certificates are cryptographically signed, which makes tamper-proof, as well as the identity data enclosed. Additionally, in some implementations of the hosted secrets management transport system and method 100, authentication occurs through other cryptographically signed tokens, for example the Kubernetes Service Account Token. These tokens are verified from the storage technology to the originating service by means of the cryptographic signature. This creates a similar cryptographic and tamper-proof signing method that is used via the x.509 certificates.

One of many technological improvements provided by the hosted secrets management transport system and method 100 is that the underlying storage technology that interacts with the system 100 does not have to operate in the same operating system used by the system 100. In some implementations, the hosted secrets management transport system and method 100 is based in Linux; however, in other implementations, the hosted secrets management transport system and method 100 connects to a storage technology running in alternate operating systems, such as Windows. The ability of the hosted secrets management transport system and method 100 to cross not only the environment (e.g., cloud) in which the network is based, but to also cross the operating system of the storage technology, enables the hosted secrets management transport system and method 100 to truly be a universally applicable network for secrets management. In contrast, competitor secrets management systems are not able to function cross-environment and/or function cross operating system of the storage technology. Instead, these competitor secrets management systems are only functional in a specific cloud environment and/or only are only functional in a specific operating system of the storage technology.

Notably, one or more implementations of the hosted secrets management transport system and method 100 distribute secrets to multiple connected environments and enable the ability to retrieve secrets, export secrets, or both. However, some Hardware Security Module technologies only allow for the import of secrets and not the retrieval secrets. Accordingly, this is another technological improvement provided by the hosted secrets management transport system and method 100 over some competitor systems.

Figure 6:
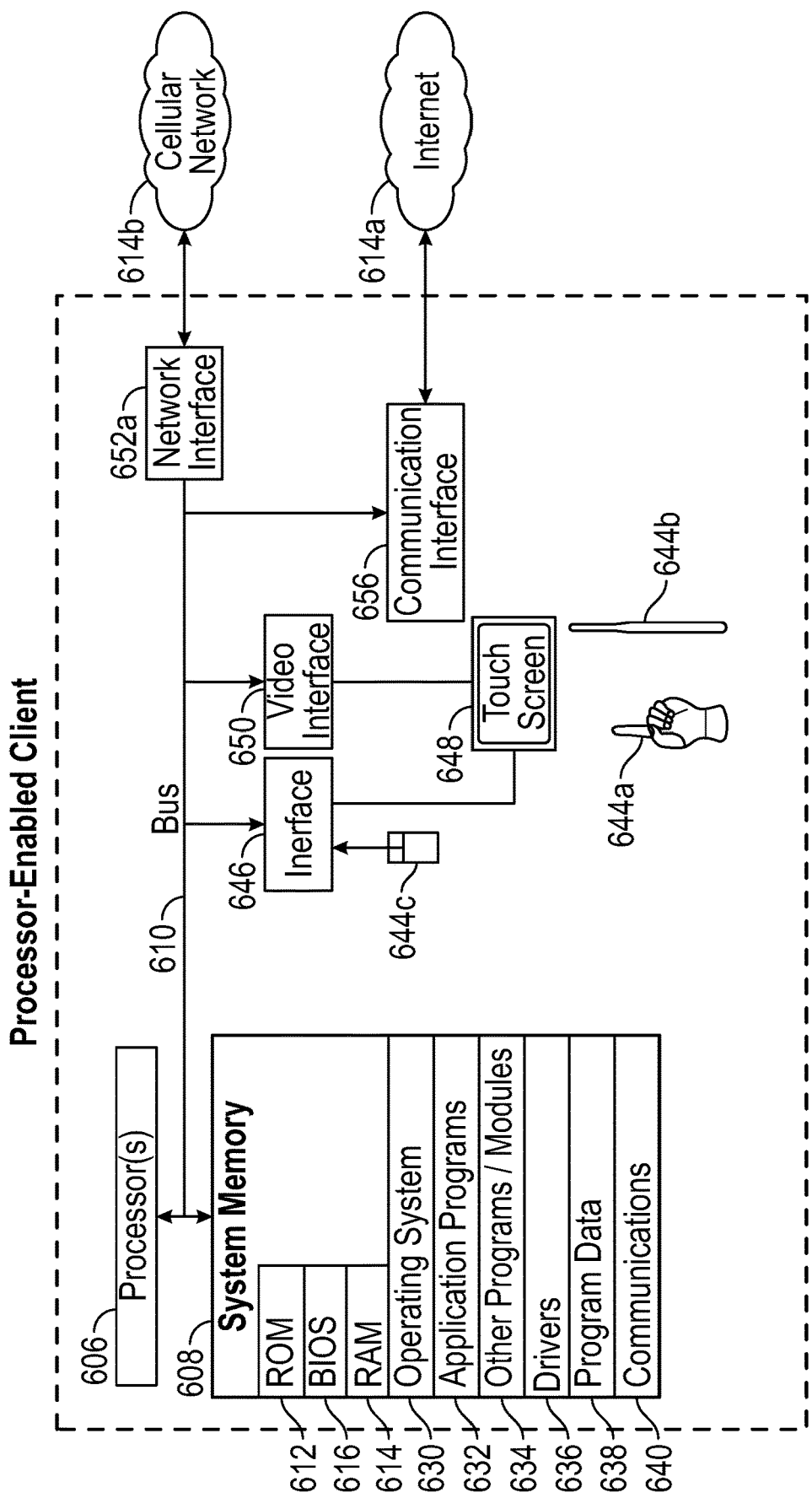
FIG. 6 is a block diagram of an example processor-based client used with a hosted secrets management transport system.

For use in conjunction with the hosted secrets management transport system and method 100, FIG. 6 shows a processor-based device suitable for implementing computing infrastructure for the development clients and production clients, as described in FIGS. 3-5. Although not required, some portion of the implementations will be described in the general context of processor-executable instructions or logic, such as program application modules, objects, or macros being executed by one or more processors. Those skilled in the relevant art will appreciate that the described implementations, as well as other implementations, can be practiced with various processor-based system configurations, including handheld devices, such as smartphones and tablet computers, wearable devices, multiprocessor systems, microprocessor-based or programmable consumer electronics, personal computers ("PCs"), network PCs, minicomputers, mainframe computers, and the like.

In some implementations, the clients in the hosted secrets management transport system and method 100 may include one or more processors 606, a system memory 608 and a system bus 610 that couples various system components including the system memory 608 to the processor(s) 606. The processor-based clients will, at times, be referred to in the singular herein, but this is not intended to limit the implementations to a single system, since in certain implementations, there will be more than one system or other networked computing device involved. Non-limiting examples of commercially available systems include, but are not limited to, ARM processors from a variety of manufactures, Core microprocessors from Intel Corporation, U.S.A., PowerPC microprocessor from IBM, Sparc microprocessors from Sun Microsystems, Inc., PA-RISC series microprocessors from Hewlett-Packard Company, and 68xxx series microprocessors from Motorola Corporation.

The processor(s) 606 in the processor-based clients of the hosted secrets management transport system and method 100 may be any logic processing unit, such as one or more central processing units (CPUs), microprocessors, digital signal processors (DSPs), application-specific integrated circuits (ASICs), field programmable gate arrays (FPGAs), and the like. Unless described otherwise, the construction and operation of the various blocks shown in FIG. 6 are of conventional design. As a result, such blocks need not be described in further detail herein, as they will be understood by those skilled in the relevant art.

The system bus 610 in the processor-based clients of the hosted secrets management transport system and method 100 can employ any known bus structures or architectures, including a memory bus with a memory controller, a peripheral bus, and a local bus. The system memory 608 includes read-only memory ("ROM") 612 and random access memory ("RAM") 614. A basic input/output system ("BIOS") 616, which can form part of the ROM 612, contains basic routines that help transfer information between elements within a processor-based device, such as during start-up. Some implementations may employ separate buses for data, instructions and power.

The processor-based clients of the hosted secrets management transport system and method 100 may also include one or more solid state memories; for instance, a Flash memory or solid state drive (SSD), which provides nonvolatile storage of computer-readable instructions, data structures, program modules and other data for the processor-based device. Although not depicted, the processor-based device can employ other non-transitory computer- or processor-readable media, for example, a hard disk drive, an optical disk drive, or a memory card media drive.

Program modules in the processor-based clients of the hosted secrets management transport system and method 100 can be stored in the system memory 608, such as an operating system 630, one or more application programs 632, other programs or modules 634, drivers 636 and program data 638.

The system memory 608 in the processor-based clients of the hosted secrets management transport system and method 100 may also include communications programs 640, for example, a server and/or a web client or browser for permitting the processor-based device to access and exchange data with other systems such as user computing systems, websites on the Internet, corporate intranets, or other networks as described below. The communications program 640 in the depicted implementation is markup language based, such as Hypertext Markup Language (HTML), Extensible Markup Language (XML) or Wireless Markup Language (WML), and operates with markup languages that use syntactically delimited characters added to the data of a document to represent the structure of the document. A number of servers and/or web clients or browsers are commercially available, such as those from Mozilla Corporation of California and Microsoft of Washington.

While shown in FIG. 6 as being stored in the system memory 608, operating system 630, application programs 632, other programs/modules 634, drivers 636, program data 638 and server and/or browser can be stored on any other of a large variety of nontransitory processor-readable media (e.g., hard disk drive, optical disk drive, SSD and/or flash memory).

A user of a processor-based client of the hosted secrets management transport system and method 100 can enter commands and information via a pointer, for example, through input devices such as a touch screen 648 via a finger 644a, stylus 644b, or via a computer mouse or trackball 644c which controls a cursor. Other input devices can include a microphone, joystick, game pad, tablet, scanner, biometric scanning device, and the like. These and other input devices (i.e., "I/O devices") are connected to the processor(s) 606 through an interface 646 such as a touch-screen controller and/or a universal serial bus ("USB") interface that couples user input to the system bus 610, although other interfaces such as a parallel port, a game port or a wireless interface or a serial port may be used. The touch screen 648 can be coupled to the system bus 610 via a video interface 650, such as a video adapter to receive image data or image information for display via the touch screen 648. Although not shown, the processor-based client can include other output devices, such as speakers, vibrator, haptic actuator or haptic engine, and the like.

The processor-based clients of the hosted secrets management transport system and method 100 operate in a networked environment using one or more of the logical connections to communicate with one or more remote computers, servers and/or devices via one or more communications channels, for example, one or more networks 614a, 614b. These logical connections may facilitate any known method of permitting computers to communicate, such as through one or more LANs and/or WANs, such as the Internet, and/or cellular communications networks. Such networking environments are well known in wired and wireless enterprise-wide computer networks, intranets, extranets, the Internet, and other types of communication networks. Such other types of communication networks include telecommunications networks, cellular networks, paging networks, and other mobile networks.

When used in a networking environment, the processor-based clients of the hosted secrets management transport system and method 100 may include one or more network, wired or wireless communications interfaces 652a, 656 (e.g., network interface controllers, cellular radios, WI-FI radios, Bluetooth radios) for establishing communications over the network, for instance, the Internet 614a or cellular network 614b.

In a networked environment, program modules, application programs, or data, or portions thereof, can be stored in a server computing system (not shown). Those skilled in the relevant art will recognize that the network connections shown in FIG. 6 are only some examples of ways of establishing communications between computers, and other connections may be used, including wirelessly.

For convenience, the processor(s) 606, system memory 608, and network and communications interfaces 652a, 656 are illustrated as communicably coupled to each other via the system bus 610, thereby providing connectivity between the above-described components. In alternative implementations of the processor-based device, the above-described components may be communicably coupled in a different manner than illustrated in FIG. 6. For example, one or more of the above-described components may be directly coupled to other components, or may be coupled to each other, via intermediary components (not shown). In some implementations, system bus 610 is omitted, and the components are coupled directly to each other using suitable connections.

Throughout this specification and the appended claims the term "communicative" as in "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), one or more communicative link(s) through one or more wireless communication protocol(s), and/or optical pathways (e.g., optical fiber), and exemplary communicative couplings include, but are not limited to, electrical couplings, magnetic couplings, wireless couplings, and/or optical couplings.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," "to, at least, provide," "to, at least, transmit," and so on.

The above description of illustrated implementations, including what is described in the Abstract, is not intended to be exhaustive or to limit the implementations to the precise forms disclosed. Although specific implementations of and examples are described herein for illustrative purposes, various equivalent modifications can be made without departing from the spirit and scope of the disclosure, as will be recognized by those skilled in the relevant art.

For instance, the foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs executed by one or more computers (e.g., as one or more programs running on one or more computer systems), as one or more programs executed by one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory processor-readable medium" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

The various implementations described above can be combined to provide further implementations. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the implementations can be modified, if necessary, to employ systems, circuits and concepts of the various patents, applications and publications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A hosted secrets management transport system for managing secrets at one or more offsite locations, the system comprising:
   a server including one or more processors and a memory device storing a set of instructions that when executed by the one or more processors, causes the one or more processors to:
   define boundaries for two or more sovereignties that are larger functional groupings of components, each sovereignty having an independent master record, wherein each sovereignty includes two or more regions;
   access, within a primary region, a master record hardware security module that is a primary storage of secrets for that sovereignty;
   access, within the one or more secondary regions, a backup record hardware security module that is where data backups of the secrets from the master record hardware security module are created;
   execute live replication from the master record hardware security module to the backup record hardware security module that supports multi-tenancy secret management of multiple distinct companies at a same time;
   access, in each of the two or more regions, a primary cache hardware security module;
   access, in each of the two or more regions, a hardware security module cache pool; and
   receive a request for values at a software container;
   wherein, when a value is requested that is not present, the system looks up an originating sovereignty of the value and, if different than the request originating sovereignty and permissible, makes a request to the originating sovereignty for the value, which is then cached in the primary cache hardware security module of the region in which the request originated, wherein the value is then distributed to the hardware security module cache pool via live replication.

2. The system of claim 1, wherein the sovereignties are defined based on geopolitical boundaries, wherein the geopolitical boundaries include countries, unions of countries, or groups of countries, wherein the sovereignties are defined based arbitrarily to organize regions and keep secrets bound to a single group, company, or enterprise, wherein the regions are defined by real-world boundaries that include regional directions or countries within one of the sovereignties, wherein the regions are based on entirely unique datacenters that are contained within one or more of a same cloud provider, different cloud providers, on-premises systems, and private clouds, and wherein a secondary region provides for high availability in an event the entire primary region is rendered unavailable.

3. The system of claim 1, wherein the master record is where all write actions occur.

4. The system of claim 1, wherein no read actions occur on the master record except during emergency situations.

5. The system of claim 1, wherein the backup record hardware security module keeps loads on the master record hardware security module as low as possible, to reduce or eliminate a possibility of a database lock occurring.

6. The system of claim 1, wherein the primary cache hardware security module serves as a primary replication source for all cached values in its corresponding region.

7. The system of claim 1, wherein the system securely distributes the replicated values amongst the sovereignties to provide reduced request latency, and distributes the replicated values through the primary cache hardware security modules and hardware security module cache pools while the master record hardware security modules of the corresponding sovereignties always contain original values.

8. The system of claim 1, wherein each of the two or more regions include a database cluster, of which one is designated as the primary, wherein data is stored in the primary database cluster, and from the primary database cluster, the data is replicated globally to distributed replica databases.

9. The system of claim 8, wherein the data stored in the primary database cluster is metadata of the secrets managed in the system including one or more of: name, internal name, version numbers, originating sovereignty, and security policies guarding where the values are able to be distributed.

10. The system of claim 8, wherein the data is stored as a stream of events that are rendered to build a metadata entity, rather than storing the metadata as a single entity.

11. The system of claim 10, wherein the stream of events provides a persistent audit log of all events that result in mutating actions being taken.

12. The system of claim 11, wherein events in the persistent audit log are analyzed for anomalies and security issues using machine learning.

13. The system of claim 1, wherein a client is created by a user and bound to a KeyRing, while restricting the client's access to values of a specific environment, which ensures that production and development values are not crossed.

14. The system of claim 13, wherein the client is bound to the specific environment.

15. The system of claim 13, wherein different types of specific environments include Production, Staging, Testing, and Development.

16. The system of claim 1, wherein every region includes a private subnet that contains all of the components in the region, wherein all other systems in one of the regions are located in private subnets within various availability zones, which eliminates any possibility of a direct contact via an external connection to the Internet.

17. The system of claim 1, wherein all communication between regions and communication between sovereignties are handled by encrypted connections.

18. A hosted secrets management transport method for managing secrets at one or more offsite locations, the method comprising:
defining boundaries for two or more sovereignties that are larger functional groupings of components, each sovereignty having an independent master record, wherein each sovereignty includes two or more regions;
defining a primary region within the two or more regions;
defining one or more secondary regions that are not the primary region;
accessing, within the one or more secondary regions, a backup record encrypted data store that is where data backups of the secrets from the master record encrypted data store are created;
executing live replication from the master record encrypted data store to the backup record encrypted data store that supports multi-tenancy secret management of multiple distinct companies at the same time; and
receiving a request for values at a software container;
wherein, when a value is requested that is not present, the system looks up an originating sovereignty of the value and, if different than the request originating sovereignty and permissible, makes a request to the originating sovereignty for the value, which is then cached in the primary cache encrypted data store of the region in which the request originated, wherein the value is then distributed to the encrypted data store cache pool via live replication.

19. The method of claim 18, wherein the sovereignties are defined based on geopolitical boundaries, wherein the geopolitical boundaries includes countries, unions of countries, or groups of countries, wherein the sovereignties are defined based arbitrarily to organize regions and keep secrets bound to a single group, company, or enterprise, wherein the regions are defined by real-world boundaries that include regional directions or countries within one of the sovereignties, wherein the regions are based on entirely unique datacenters that are contained within one or more of a same cloud provider, different cloud providers, on-premises systems, and private clouds, wherein a secondary region provides for high availability in an event the entire primary region is rendered unavailable.

20. The method of claim 18, wherein the master record is where all write actions occur.

21. The method of claim 18, wherein no read actions occur on the master record except during emergency situations.

22. The method of claim 18, wherein the backup record encrypted data store keeps loads on the master record encrypted data store as low as possible, to reduce or eliminate a possibility of a database lock occurring.

23. The method of claim 18, wherein the primary cache encrypted data store serves as a primary replication source for all cached values in its corresponding region.

24. The method of claim 18, wherein the method securely distributes the replicated values amongst the sovereignties to provide reduced request latency, and distributes the replicated values through the primary cache encrypted data stores and encrypted data store cache pools while the master record encrypted data stores of the corresponding sovereignties always contain original values.

25. The method of claim 18, wherein one region is designated with a primary database cluster, wherein data is stored in the primary database cluster, and from the primary database cluster, the data is replicated globally to distributed replica databases located in each region.

26. The method of claim 25, wherein the data stored in the primary database cluster is metadata of the secrets managed in the system including one or more of:
name, internal name, version numbers, originating sovereignty, and security policies guarding where the values are able to be distributed.

27. The method of claim 25, wherein the data is stored as a stream of events that are rendered to build a metadata entity, rather than storing the metadata as a single entity.

28. The method of claim 27, wherein the stream of events provides a persistent audit log of all events that result in mutating actions being taken.

29. The method of claim 28, wherein events in the persistent audit log are analyzed for anomalies and security issues using machine learning.

30. The method of claim 18, wherein a client is created by a user and bound to a KeyRing, while restricting the client's access to values of a specific environment, which ensures that production and development values are not crossed.

31. The method of claim 30, wherein the client is bound to the specific environment.

32. The method of claim 30, wherein different types of specific environments include Production, Staging, Testing, and Development.

33. The method of claim 18, wherein every region includes a private subnet that contains all of the components in the region, wherein all other systems in one of the regions are located in private subnets within various availability zones, which eliminates any possibility of a direct contact via an external connection to the Internet.

34. The method of claim 23, wherein all communication between regions and communication between sovereignties are handled by encrypted connections.

35. The method of claim 23, wherein the master record encrypted data store, the backup record encrypted data store, the primary cache encrypted data store, and the cache pool encrypted data store are each selected from one or more of a hardware security module or other storage medium where data is encrypted at rest.

36. A hosted secrets management transport system for managing secrets at one or more offsite locations, the system comprising:
   two or more sovereignties that are larger functional groupings of components, each sovereignty with an independent master record, wherein each sovereignty includes two or more regions that further include at least a primary region and a secondary region;
   a master record encrypted data store, included in the primary region, that is a primary storage of secrets for that sovereignty;
   a backup record encrypted data store, included in one or more secondary regions that is not the primary region, that receives live replication from the master record encrypted data store that supports multi-tenancy secret management of multiple distinct companies at a same time, wherein the backup record encrypted data store is where data backups are created from the master record encrypted data store;
   a primary cache encrypted data store, contained in each of the two or more regions, that receives live replication from the backup record encrypted data store;
   an encrypted data store cache pool contained in each of the two or more regions; and
   a cluster of software containers and a software container management system included in each of the two or more regions;
   wherein, when a value is requested that is not present, the system identifies an originating sovereignty of the value and, if different than the request originating sovereignty and permissible, makes a request to the originating sovereignty for the value, which is then cached in the primary cache encrypted data store of the region in which the request originated, wherein the value is then distributed to the encrypted data store cache pool via live replication.

37. The system of claim 36, wherein the master record encrypted data store, the backup record encrypted data store, the primary cache encrypted data store, and the cache pool encrypted data store are each selected from one or more of a hardware security module or other storage medium where data is encrypted at rest.

38. A hosted secrets management transport system for managing secrets at one or more offsite locations, the system comprising:
   a server including one or more processors and a memory device storing a set of instructions that when executed by the one or more processors, causes the one or more processors to:
   define boundaries for two or more sovereignties that are larger functional groupings of components, each sovereignty having an independent master record, wherein each sovereignty includes two or more regions;
   access, within the one or more secondary regions, a backup record hardware security module that is where data backups of the secrets from a master record hardware security module are created; and
   execute live replication from the master record hardware security module to the backup record hardware security module that supports multi-tenancy secret management of multiple distinct companies at a same time;
   wherein, when a value is requested that is not present, the system looks up an originating sovereignty of the value and, if different than the request originating sovereignty and permissible, makes a request to the originating sovereignty for the value, which is then cached in a primary cache hardware security module of the region in which the request originated, wherein the value is then distributed to a hardware security module cache pool via live replication.

39. A hosted secrets management transport method for managing secrets at one or more offsite locations, the method comprising:
   defining boundaries for two or more sovereignties that are larger functional groupings of components, each sovereignty having an independent master record, wherein each sovereignty includes two or more regions;
   defining one or more secondary regions that are not the primary region;
   accessing, within the one or more secondary regions, a backup record encrypted data store that is where data backups of the secrets from the master record encrypted data store are created; and
   executing live replication from the master record encrypted data store to the backup record encrypted data store that supports multi-tenancy secret management of multiple distinct companies at the same time;
   wherein, when a value is requested that is not present, the system looks up an originating sovereignty of the value and, if different than the request originating sovereignty and permissible, makes a request to the originating sovereignty for the value, which is then cached in the primary cache encrypted data store of the region in which the request originated, wherein the value is then distributed to the encrypted data store cache pool via live replication.

40. A hosted secrets management transport system for managing secrets at one or more offsite locations, the system comprising:
   two or more sovereignties that are larger functional groupings of components, each sovereignty with an independent master record, wherein each sovereignty includes two or more regions that further include at least a primary region and a secondary region;
   a backup record encrypted data store, included in one or more secondary regions that is not the primary region, that receives live replication from a master record encrypted data store that supports multi-tenancy secret management of multiple distinct companies at a same time, wherein the backup record encrypted data store is where data backups are created from the master record encrypted data store; and a primary cache encrypted data store, contained in each of the two or more regions, that receives live replication from the backup record encrypted data store;

wherein, when a value is requested that is not present, the system identifies an originating sovereignty of the value and, if different than the request originating sovereignty and permissible makes a request to the originating sovereignty for the value, which is then cached in the primary cache encrypted data store of the region in which the request originated, wherein the value is then distributed to a encrypted data store cache pool via live replication.

\* \* \* \* \*